United States Patent [19]

Bowditch

[11] Patent Number: 4,942,726
[45] Date of Patent: Jul. 24, 1990

[54] MECHANISM AND METHOD FOR CONVERTING A FIXED WHEEL WALK-BEHIND MOWER TO A CASTER WHEEL WALK-BEHIND MOWER AND VICE VERSA

[75] Inventor: Hoel L. Bowditch, Foxboro, Mass.

[73] Assignee: Deere & Company, Moline, Ill.

[21] Appl. No.: 270,480

[22] Filed: Nov. 7, 1988

Related U.S. Application Data

[63] Continuation-in-part of Ser. No. 90,648, Aug. 28, 1987, abandoned.

[51] Int. Cl.$^5$ ............................................. A01D 34/74
[52] U.S. Cl. ..................... 56/17.2; 56/17.5; 280/43.13
[58] Field of Search ............... 56/320.1, 320.2, 17.5, 56/17.2, 17 I, 255, 16.7; 280/43.13

[56] References Cited

U.S. PATENT DOCUMENTS

| | | | |
|---|---|---|---|
| 2,308,076 | 1/1943 | Hainke | 56/320.2 |
| 2,857,725 | 10/1958 | Canfield | 56/320.1 |
| 3,952,483 | 4/1976 | Masterson | 56/17.2 |
| 4,028,868 | 6/1977 | Zehrung | 56/320.1 |
| 4,172,351 | 10/1979 | Scanland | 56/320.1 |
| 4,224,785 | 9/1980 | Hoch | 280/43.13 |
| 4,422,283 | 12/1983 | Scanland | 56/320.2 |

FOREIGN PATENT DOCUMENTS 1363341 8/1974 United Kingdom .

OTHER PUBLICATIONS

Befco Finishing Mower.

*Primary Examiner*—John Weiss

[57] ABSTRACT

.A mechanism and a method for converting a fixed wheeled walk-behind mower into a caster wheel walk-behind mower and vice versa comprising two caster wheel assemblies having wheels mounted in brackets journalled for rotation in frames. Each frame has means for attaching the mechanism to the front wheel axle. Each caster wheel assembly comprises an elongated member connected to each frame and extending the length of the mower on e.ach side between the frame and the respective rear wheel axle or mower housing. At the end of the elongated member most remote from its connection to each of the frames, a U-shaped notch is formed therein for connection with the housing. A tie rod is provided for interconnecting the two frames, for adding rigidity to the assembly and for maintaining the correct, constant distance between the frames. The mechanism can be rapidly converted between castering and a conventional walk-behind mower with fixed direction wheels with the only modification being the forming of a groove in the rear axle proximate each rear wheel.

31 Claims, 4 Drawing Sheets

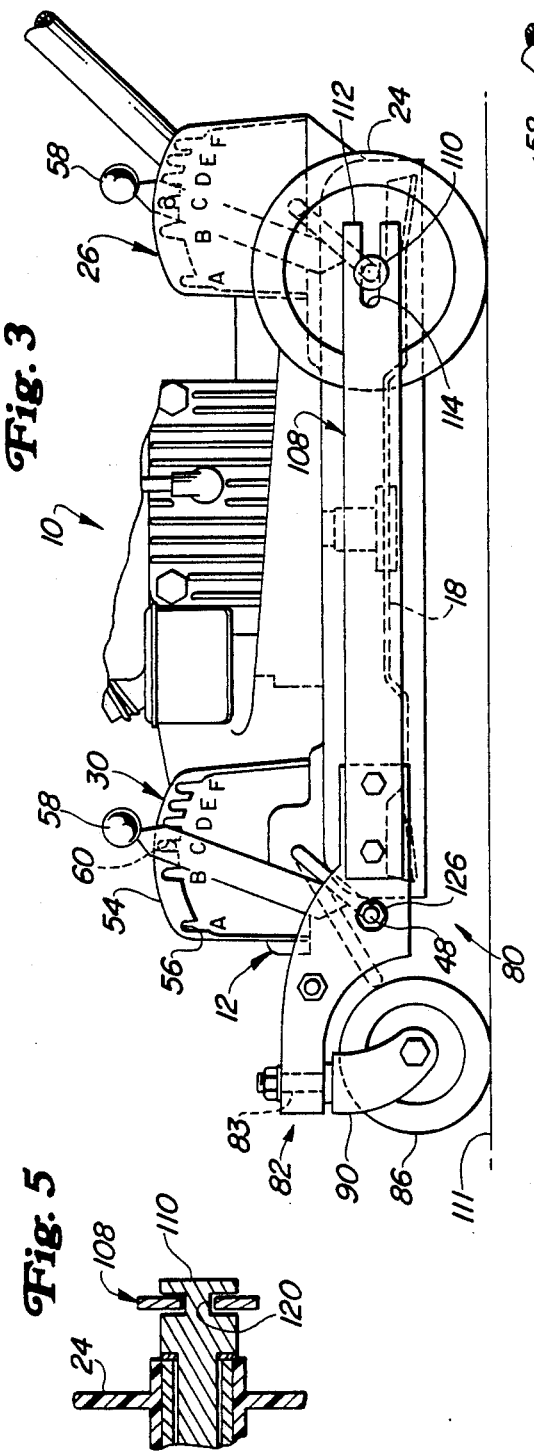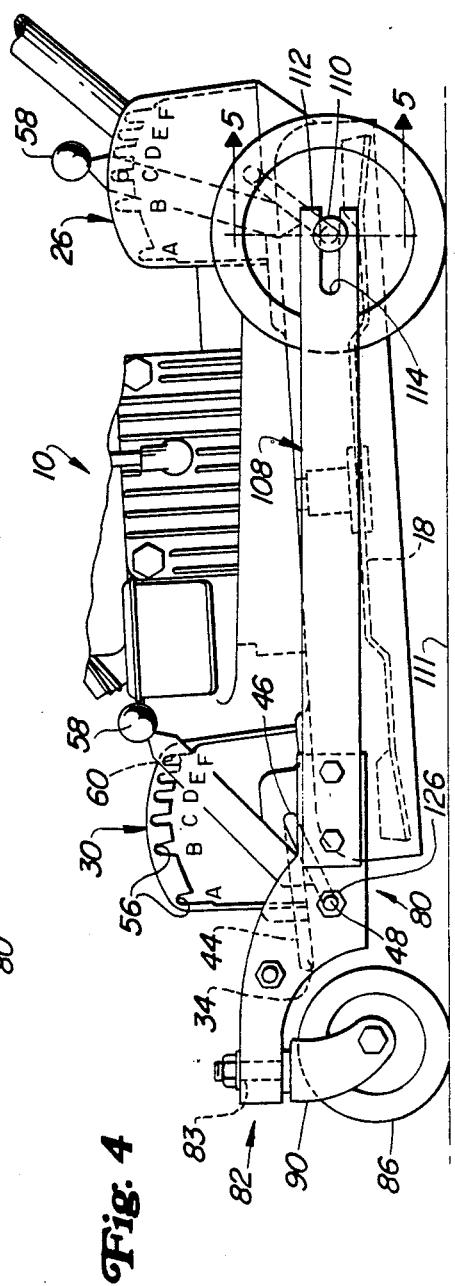

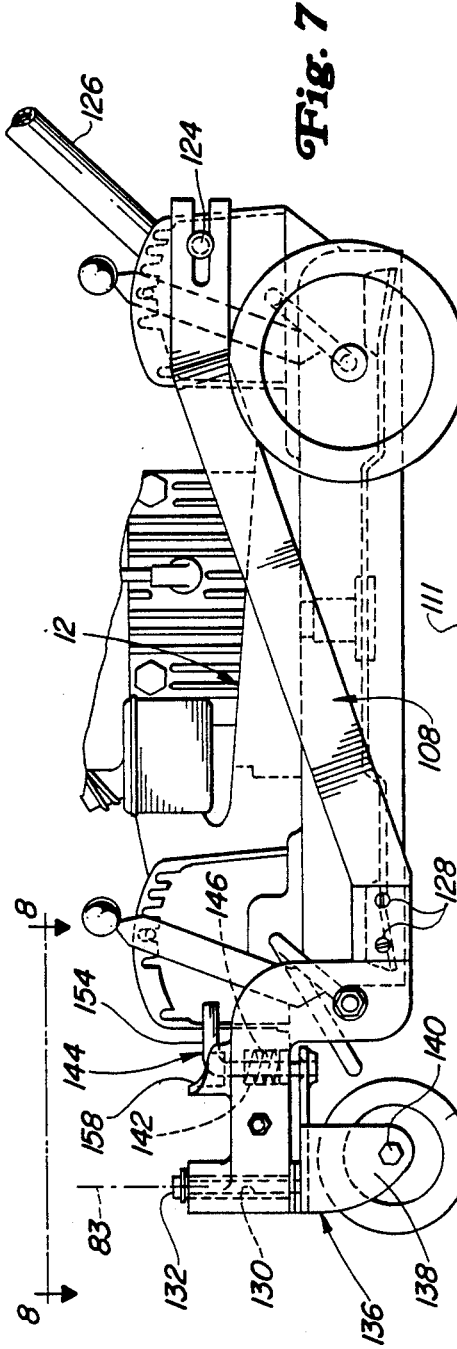
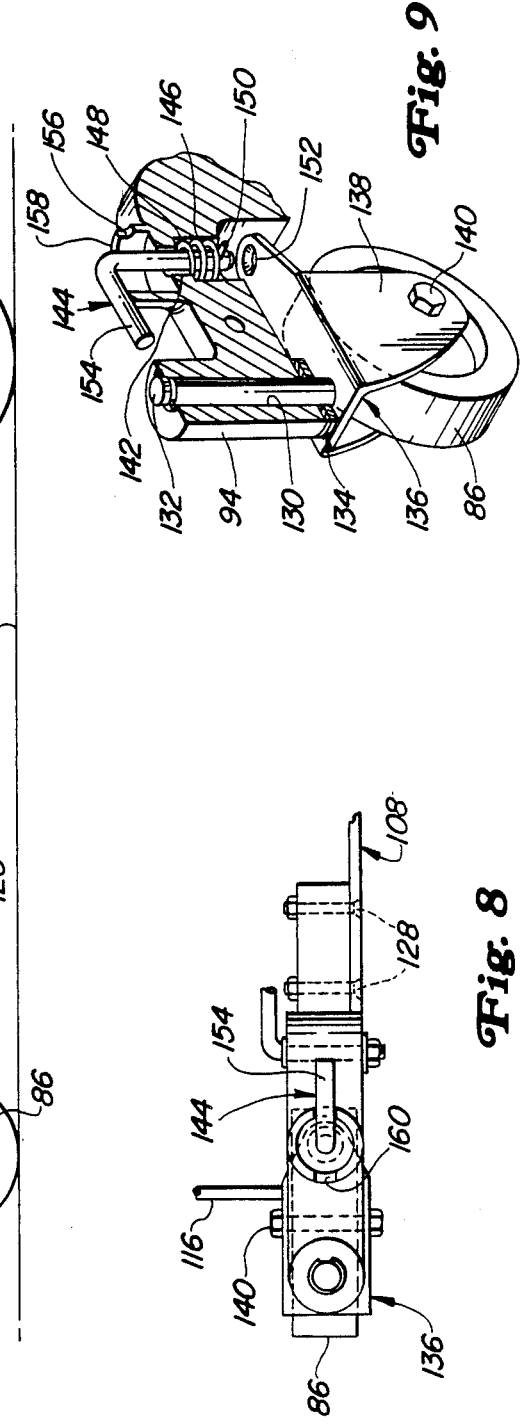
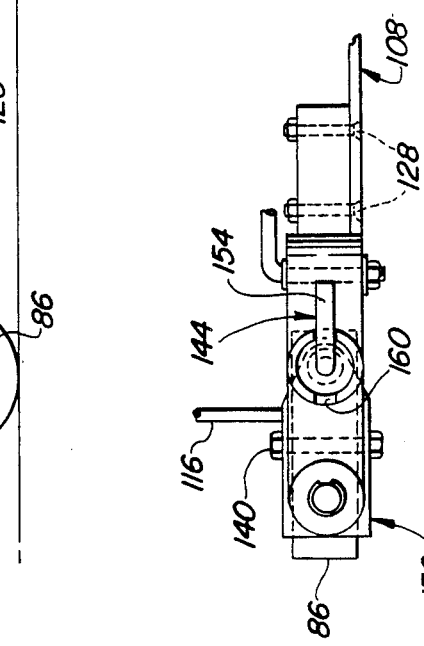

MECHANISM AND METHOD FOR CONVERTING A FIXED WHEEL WALK-BEHIND MOWER TO A CASTER WHEEL WALK-BEHIND MOWER AND VICE VERSA

This application is a continuation-in-part of application Ser. No. 07/090,648, filed 28 Aug. 1987 now abandon.

BACKGROUND OF THE INVENTION

The present invention relates to walk-behind mowers and more particularly relates to a mechanism and a method for converting either a three fixed wheel or a fixed four wheel walk-behind mower into a more maneuverable mower having at least one caster wheel.

It is common practice to provide walk-behind mowers with four fixed wheels and also to provide some walk-behind mowers with two fixed and two caster wheels. It is also known to provide some walk-behind mowers with three fixed wheels and also to provide some three wheeled walk-behind mowers with two fixed and one caster wheel. It is well known that these wheel configurations each have their advantages and disadvantages. Specifically, if one has requirements for both types of walk-behind wheel constructions, one normally must purchase two separate mowers, i.e. one with all fixed wheels and one with two fixed and at least one caster wheel.

Examples of prior fixed wheel mowers include U.S. Pat. No. 4,224,785 which is representative of hundreds of patents illustrating the four fixed wheel construction.

Utilization of caster wheels on walk-behind mowers is well known as can be seen from the following list of seventeen (17) patents:

| | |
|---|---|
| 4,020,619 | Massaro |
| 3,924,389 | Kita |
| 3,782,085 | Parker et al. |
| 3,690,047 | Thoen et al. |
| 3,411,276 | Buigne |
| 3,367,459 | Rubin |
| 3,196,971 | Schantz |
| 3,152,431 | Ott et al. |
| 3,032,957 | Boyer |
| 3,012,389 | Jacobs |
| 2,898,723 | Goodall |
| 2,707,858 | Norton et al. |
| 2,651,530 | Blydenburgh |
| 2,529,870 | Golasky |
| 2,505,377 | Barker et al. |
| 2,489,730 | Soenksen |

Recent caster wheel constructions include the use of caster wheels as the front wheels in remotely controlled self-propelled power lawn mowers as disclosed in U.S. Pat. No. 4,318,266 to Max Taube. However, in this construction, the single front caster wheel is connected to a steering mechanism thereby losing its pure caster wheel function.

While all of the above patents disclose walk-behind mowers having caster wheels, none appears to provide a mechanism and a method which allows for the conversion of the fixed wheel to a caster wheel and vice versa.

Thus, there is a need for a mechanism and a method for converting a four fixed wheel walk-behind mower into a two fixed and two caster wheel walk-behind mower; which can be installed to convert the mower in a relatively short time; which provides mower cut height adjustment with the conversion mechanism attached; which increases the maneuverability of the mower with the conversion mechanism attached; which prevents turf scuffing when turning the mower with the conversion mechanism attached and; which provides for trimming under shrubs and trees and other maneuvers without raising the front of the deck with the conversion mechanism attached.

SUMMARY OF THE INVENTION

The present invention is a mechanism and a method for converting a fixed wheel walk-behind mower into a caster wheel walk-behind mower and vice versa in a relatively short period of time.

In accordance with the present invention, the mechanism includes two caster wheel assemblies each having wheels rotatably mounted in brackets which in turn are journalled for rotation in respective frames. Each of the caster wheel assemblies further comprises, an elongated member connected to the frame which extends the length of the mower and is contoured to fit close to the mower deck between the frame and the respective rear wheel axle or mower housing. The end of each elongated member most remote from its connection to the frame has a connection means or a U-shaped notch formed therein. The elongated member is connected to the frame such that whenever both the front and rear wheels are adjusted to the same height, the perpendicular axis of each of the two front casters remains substantially vertical.

The method of the present invention comprises removing the front fixed wheels of the mower, assembling the U-shaped notch of one the elongated members onto the correct rear wheel axle or housing connection and then mounting the frame to the front wheel axle, mounting the second elongated member to the other side of the rear axle or housing connection and assembling the frame to the other front side of the front axle. To complete the assembly, if required, a spacer means may be assembled between the two frames. In order to disassemble the mechanism for converting the fixed wheel walk-behind mower to a caster wheel walk-behind mower, the above steps are reversed. In a modified form of the invention, the caster wheel is provided with a locking mechanism to selectively secure it in a fixed fore-and-aft direction. Therefore, once this conversion mechanism has been installed on a mower, it need not be removed to regain the fixed direction wheel capability on all wheels. The operator need only activate the locking mechanism to secure the caster wheel in the locked and fixed direction configuration.

Spacer means in the form of a tie rod may be provided for interconnecting the two frames, for adding rigidity to the assemblies and for maintaining the correct, constant distance between the frames, if such a means is deemed necessary.

The primary objective of this invention, therefore, is to provide a mechanism and a method for converting a fixed wheel walk-behind mower into a caster wheel walk-behind mower and vice versa; which can be installed or removed from the mower in less than 5 minutes; which prevents turf scuffing when turning the mower with the conversion mechanism attached; which provides for trimming under shrubs and trees and other maneuvers without raising the front end of the deck with the conversion mechanism attached; which significantly improves the overall maneuverability of the mower when the conversion mechanism is attached which provides for turning the mower easily with one hand while not scuffing the turf with the front wheels and which interconnect the front and rear wheel axles such that when the height of both axles are the same and the vertical axis of each caster remains substantially perpendicular.

Other objects and advantages of the invention will be apparent in the following description, accompanying drawings and appended claims.

BRIEF DESCRIPTION OF THE DRAWINGS

FIG. 3 is a left side view of the walk-behind lawn mower of FIG. 2 illustrating the interaction of the caster wheel mechanism of the present invention with the cutter height adjustment;

FIG. 4 is a view similar to FIG. 3 illustrating the front height adjustment positioned in the lowest position with the rear height adjustment positioned in the same position as FIG. 3;

FIG. 5 is a partial section view of the rear wheel axle taken along 5—5 of FIG. 4.

FIG. 7 is a left side view of the walk behind lawn mower illustrated in FIG. 6 and showing the position of the converting mechanism components in relation to the mower;

FIG. 8 is a plan view of the caster wheel assembly and locking mechanism taken along view 8—8 of FIG. 7; and FIG. 9 is a cut away perspective and partial view of the modified caster wheel assembly and its locking mechanism.

DESCRIPTION OF THE PREFERRED EMBODIMENT

Figure 1:
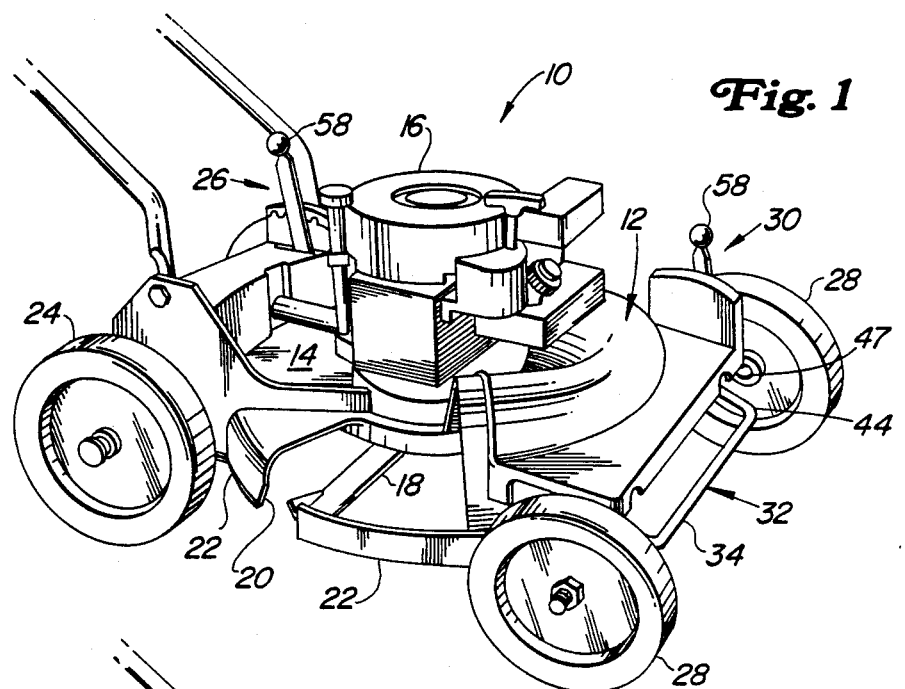
FIG. 1 is a perspective view of a representative fixed wheel walk-behind lawn mower.

Referring now to the drawings, FIG. 1 shows, for illustrative purposes, a representative fixed wheel walk-behind lawn mower 10 including a blade housing 12 having a top wall 14 on which is mounted engine 16 having a vertical drive shaft on which is mounted a mower blade 18. The conventional housing 12 includes a skirt 20 surrounding the paths swept by the blade 18 and has a lower edge 22 extending below the path of the blade 18. The housing 12 is supported by a pair of fixed direction rear ground wheels 24 which may be vertically adjusted through means of an adjustment mechanism 26 and a fixed direction front pair of ground wheels 28, vertically adjustable through means of an adjustment mechanism 30. Both adjustment mechanisms are conventional and form no part of the present invention. Thus, the specifics of the adjustment mechanisms will not be further described in detail.

Figure 2:
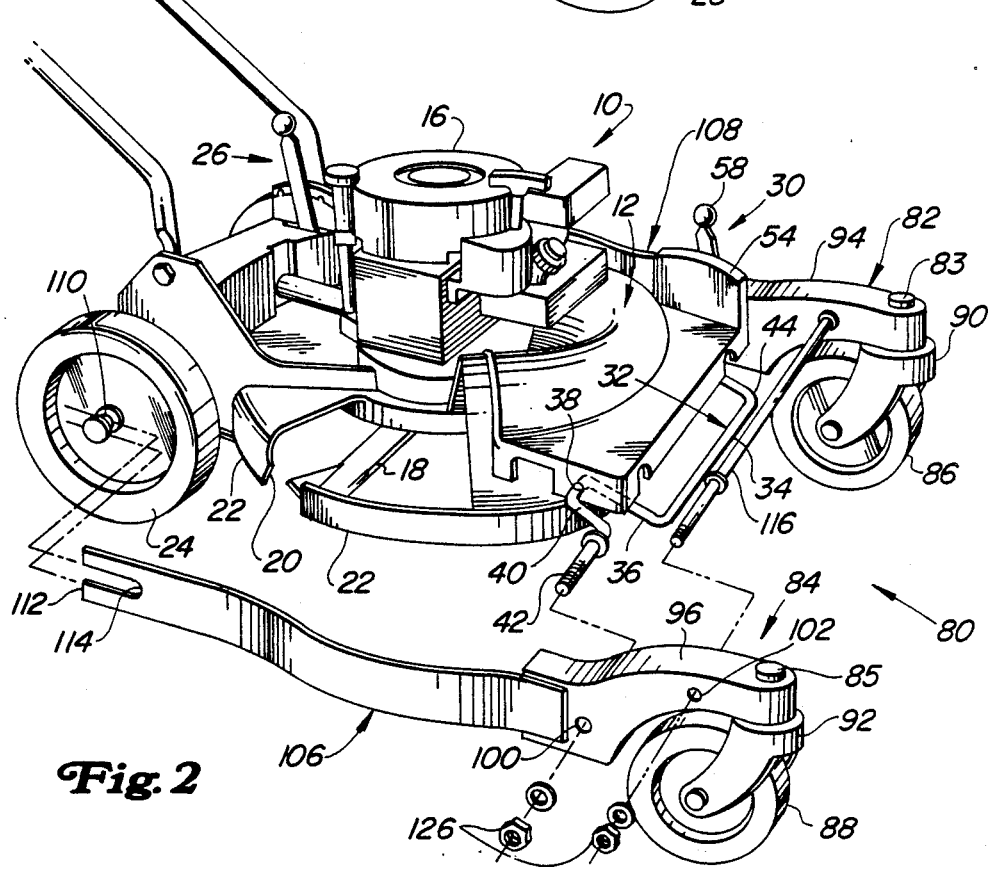
FIG. 2 is a perspective and partially exploded view of the walk-behind lawn mower of FIG. 1 converted to a caster wheel mower utilizing the caster wheel conversion mechanism of the present invention.

As shown in FIGS. 1 and 2, means for mounting the front fixed direction wheels 28 for vertical adjustment comprises an axle rod 32 having a central U-shaped portion 34. The rod 32 also includes a right leg 36 joined to a transverse mounting portion 38, which in turn is joined to a crank portion 40. The crank portion 40 has an and transverse end portion 42 on which the right front wheel is journalled for rotation. Similarly, the U-shaped portion 34 includes a left leg 44 joined to a transverse mounting portion 46, which in turn is joined to a crank portion 47. The crank portion 47 has an out turned end portion 48 (FIGS. 3 and 4) on which the fixed left front wheel 28 is journalled for rotation. The transverse mounting portions 38 and 46 are axially aligned with each other and are pivotally secured to the housing by means of transversely spaced right and left brackets (not shown).

As best shown in FIGS. 3 and 4, the adjustment mechanism 30 includes a vertical sector shaped projection 54 forming part of the left front of the housing 12 and includes the series of angularly spaced detent notches 56. Fixed to the axial rod 32 adjacent the location where the mounting and crank portions 46 and 47 are joined to each other is a lever 58 preferably constructed of spring metal and carrying a pin 60 located for reception into selected ones of the detent notches 56 so as to selectively releasably hold the axle rod 32 in various angular positions and to, thus, fix the ground wheels 28 at various vertical positions relative to the housing 12.

Such adjustment of the front wheels 28 is, of course, made together with the corresponding rear wheel adjustment in order to adjust the cutting height of the mower blade 18. Thus, the mower blade 18, will be at its highest cutting height when the lever 58 is in a first extreme position labeled A. The cutting height of the blade decreases as the lever 58 is moved clockwise as to a second extreme position labeled F. The U-shaped central portion 34 of the axle rod 32 also serves as a safety guard to help prevent a person's foot which may accidentally become inserted beneath the forward end of the housing, from coming into contact with the blade. The details of this construction are disclosed in U.S. Pat. No. 4,224,785 which is hereby incorporated by reference.

While the present invention is being disclosed as being mounted on a walk-behind mower having this specific type of front axle, it should be understood that the present invention will work equally well when installed on any walk-behind mower having non-castering front wheels whether they be fixed height or adjustable height mowers having individually adjustable wheels or axles.

The present invention is intended to significantly improve the maneuverability of the fixed wheel mower 10, maintaining an open height of cut without raising the front end of the deck and lifting the front fixed wheels from the ground. It will also enable the operator to make 180° turns more easily and with one hand, while preventing scuffing of the turf as can occur with fixed front wheels. The caster wheel conversion mechanism 80 of the present invention comprises two caster wheel assemblies 82, 84 having wheels 86, 88 rotatably mounted in brackets 90, 92 which in turn are journalled for rotation in frames 94, 96. Each frame 94, 96 has at least one receiving means or aperture 100 formed therein for receiving components to be later described.

Each of the caster wheel assemblies 82, 84 has interconnection means or elongated members 106, 108 conventionally connected to the frames 94, 96 and extending the length of the mower 10 between the frames 94, 96 and the rear wheel axle 110. At one end 112 of each member 106, 108, connection means in the form of a U-shaped notch 114 is formed. Each member 106, 108 is shaped to follow the contour of the blade housing 12.

Since it is well known that in order to function satisfactorily, a caster requires that its vertical shaft be substantially perpendicular to a supporting surface or the ground 111. In the case of a lawn mower 10 having caster wheels 86, 88, it is important to the present invention 80 that, when assembled on the mower 10, the vertical axes 83, 85 of the caster wheels remain substantially perpendicular to the ground 111 at all times. In order to accomplish this, if each of the mower wheels is adjusted to the same position, thereby providing for parallel rotation of the cutting blade 18 with reference to the ground 111, it is apparent that under these conditions, the center or the axis of each wheel is the same distance from the ground 111. Thus, by interconnecting the front and rear axles, utilizing the elongated members 100, 108, whenever the cutting height is changed and both the front and rear wheels are adjusted to the same height, the vertical axes 83, 85 of each of the two caster wheels 86, 88 remains substantially perpendicular to the ground 111.

A tie rod 116 may be provided for interconnecting the two caster wheel assemblies 82, 84, to add rigidity to the assembly 80 and maintain the correct, constant distance between the frames 94, 96.

In order to prepare the conventional mower 10 to receive the caster wheel conversion mechanism 80, a groove 120 (see FIG. 5) may be provided at each end of the rear axle.

The method for converting a conventional mower 10 from one having fixed front wheels 58 to one having the caster wheel conversion mechanism 80 of the present invention requires only a few minutes. To accomplish the conversion in a short time, it is preferred that, the rear wheel axle 110 be modified to receive the U-shaped notch 114 of each elongated member 106, 108. This may be done by machining or reducing the diameter of each rear axle to correspond to the width of the U-shaped notch 114. Once the walk-behind mower is so modified, the left and right front wheels 28 are removed. Next, one of the two elongated members such as 106 is connected to the rear axle by positioning notch 114 in the groove 120. Then the frame 96 is connected to the front axle by inserting the end portion 42 of the axle 32 through the aperture 100. Next, the second elongated member U-shaped slot 114 is fitted into the other rear axle groove 120 and the second frame 94, 96 is connected to the other end portion 48 of the front axle. During this process, if a tie rod is being utilized, one of the frames such as 94 (illustrated in FIG. 2) will normally have the tie rod 116 connected and extending through the second aperture 102. As the second frame 94 is being connected to the front axle 32, the tie rod 116 may be inserted through the second aperture 102 to secure the second frame 94 to the axle.

At this point, the conversion process has been completed and the walk-behind mower now has the improved features provided by the front caster wheel assembly. It should be understood that either the left or the right frame member of the caster wheel assembly 82, 84 can be first assembled to the mower.

In order to convert back to the conventional fixed wheel walk-behind mower, the above steps are reversed beginning on either the left or right side of the mower. Likewise, this process takes only a few minutes.

A modified form of the invention is illustrated in FIGS. 6, 7, 8 and 9. With this form of the invention, the caster wheel 86 or 88 can be free wheeling or it can be locked into a fixed fore-and-aft direction. Further, the elongated member 108 is shown connected at the rear of the mower 10 to a pin 124 carried on the housing 12 (see FIG. 7).

The parts comprising the modified form of the conversion mechanism are similar to those of the earlier discussed embodiment with the exception of the structure which enables the caster wheel 86 or 88 to be locked in its fore-and-aft direction. Additionally, the bolts 124 which attach the handle 126 of the mower 10 to the mower housing 12 are slightly longer to permit the elongated members 106 or 108 to be secured therein (see FIGS. 6 and 8). These bolts 124 may be slotted similarly to the slots 110 provided in the axles if desired.

Figure 6:
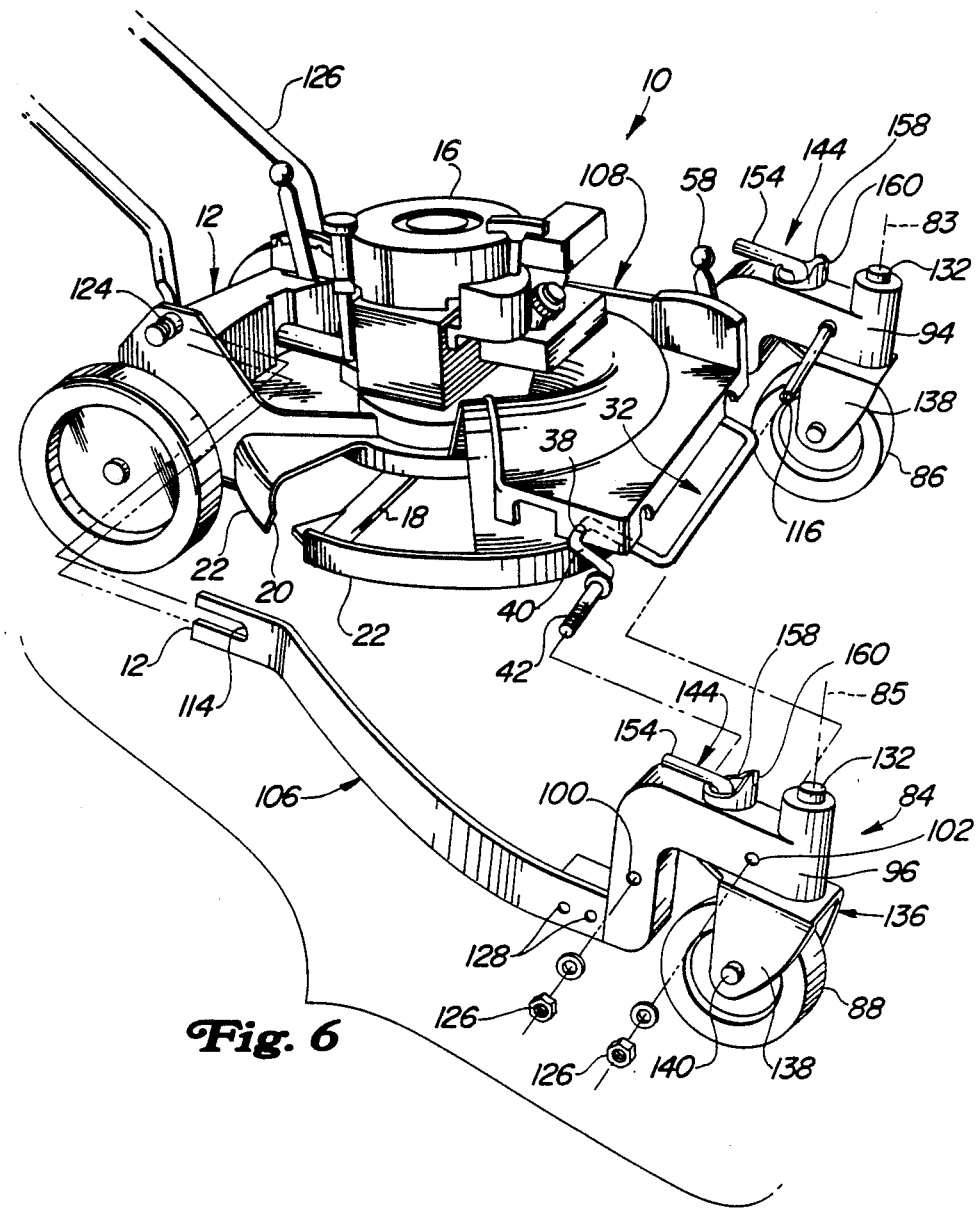
FIG. 6 is a perspective view of the walk-behind lawn mower of FIG. 1, illustrating a modified form of caster wheel conversion mechanism.

Looking now to the modified conversion mechanism for the right side of the mower illustrated in FIG. 6, there is shown a caster wheel assembly 84 connected by bolts 128 to the elongated member 106. The assembly frame 96 takes the form of a casting which includes a vertical opening 130, best shown in FIG. 9, at its forward end. A castering pin 132 rotatably is mounted in the opening 130, carried by the thrust bearing 134 and secured to the bracket 136. The bracket 136 includes the downwardly extending ear portions 138 on each side and a horizontally carried bolt 140 upon which the castering wheel 86 or 88 is rotatably mounted.

The castings 94 or 96 each include a vertical opening 142 at their rear portion in which a locking pin 144 is carried for movement between the raised and lowered positions illustrated in FIGS. 9 and 7. The lock pin 144 is surrounded by a spring 146 which is compressably mounted between the opening's upper surface, designated 148, and a transversely mounted stop pin 150 carried in the lower portion of the locking pin 144. The spring 146 serves to bias the locking pin 144 towards engagement with the vertical opening 152 in the wheel bracket 136.

When the locking pin 144 is in the position illustrated in FIGS. 7 and 8, it will extend through the chamfered opening 152 in the wheel bracket 136 and secure the wheel 86 or 88 in a fixed fore-and-aft direction. While so positioned, the handle 154 of the lock pin 144 will extend rearwardly. In this position, the pin 144 is nested in the rearward and lower seat 156 (see FIG. 9) formed in the cam surface 158 carried at the top of the rear portion of the casting housing. The cam surface 158 which is inclined downwardly from front to rear further includes a second seat 160 (see FIGS. 6 and 8) at the forward portion and opposite the rearwardly located seat. The front seat 160 is elevated to maintain the locking pin 144 out of engagement with the hole 152 in the bracket 136 and thereby permit the wheel 86 or 88 to caster. The cam surface 158 provides for positive and simple movement of the lock pin 144 between its lowered and engaged position with the chamfered opening 152 in the wheel bracket 136 and its elevated position out of engagement with the opening 152.

With the modified form of the castering wheel conversion mechanism, an operator can quickly convert the mower between castering and fixed wheel operation without being required to change wheels or parts.

Thus, it can be seen that all of the advantages and objectives of the present invention have been achieved.

While the method herein described and the form of apparatus for carrying this method into effect constitutes preferred embodiments of this invention, it is to be understood that the invention is not limited to this precise method and form of apparatus and that changes may be made in either without departing from the scope of the invention, which is defined in the appended claims.

What is claimed is:

1. A caster wheel conversion mechanism for a walk behind mower having a housing with front and rear axles carrying fixed direction wheels, said mechanism adapted to convert two fixed wheels to castering wheels and comprising:
at least two caster wheel assemblies each having axle receiving means formed therein; and
at least two interconnection means, each operatively connectable to a respective one of said caster wheel assemblies and said housing, for operatively interconnecting each of said caster wheel assemblies with said housing such that whenever the cutting height of said mower is set and both the front and rear wheels are adjusted to the approximate same height, said caster wheels remain approximately perpendicular to the surface upon which they are supported.

2. The caster wheel conversion mechanism of claim 1 further comprising:
a tie rod operatively connecting said two caster wheel assemblies, for providing rigidity to said caster wheel conversion mechanism.

3. The caster wheel conversion mechanism of claim 1 wherein either the front or rear pair of wheels are adjustable with the respect to the housing such that the cutting height of said mower is adjusted thereby.

4. The caster wheel conversion mechanism of claim 1 wherein each of said caster wheel assemblies further comprises:
an elongated assembly;
a bracket rotatably connected to said elongated assembly, and
a wheel operatively connected to said bracket.

5. The caster wheel conversion mechanism of claim 2 in which receiving means is provided in each assembly, said receiving means comprising:
first connection means for connecting said mechanism to said mower at the location where said fixed wheels are normally connected thereto; and
second connection means for connecting a wheel carrying bracket to said assembly.

6. The caster wheel conversion mechanism of claim 5 in which the receiving means further comprises:
third connection means operatively formed in each of said caster wheel assemblies for receiving one end of said tie rod.

7. The caster wheel conversion mechanism of claim 1 wherein said interconnection means further comprises:
two elongated members each having means for interconnecting each of said caster wheel assemblies and said housing such that said caster wheel assembly is approximately perpendicular to a supporting surface when each of said four wheels is adjusted to the same relative height above said supporting surface.

8. The caster wheel conversion mechanism of claim 1 wherein said interconnection means are operatively connected to the axle having fixed direction wheels still assembled thereon.

9. The caster wheel conversion mechanism of claim 8 wherein said interconnection means further comprises:
a U-shaped slot formed in each of said elongated members; and
at least two grooves formed on each respective end of said fixed wheel axle.

10. A caster wheel conversion mechanism for a cutting height adjustable walk-behind mower having a housing and fixed direction front and rear wheels, said mechanisms adapted to replace two fixed direction wheels with caster wheels having substantially vertical axes, said caster wheel conversion mechanism further comprising:
two caster wheel assemblies, each assembly comprising an elongated frame and a bracket having a wheel operatively connected thereto; and
at least two elongated members each having means for interconnecting said caster wheel assemblies with an axle such that the vertical axis of each caster wheel is maintained approximately perpendicular to the support surfaces when each of said front and rear wheels is adjusted to the same height above a supporting surface.

11. The caster wheel conversion mechanism of claim 10 further comprising:
a tie rod, operatively interconnecting said two caster wheel assemblies, for making said mechanism rigid.

12. The caster wheel conversion mechanism of claim 10 wherein each of said caster wheel assemblies further comprises:
first connection means operatively formed in each frame for connecting said mechanism to said mower at the location where one pair of said fixed direction wheels are normally connected thereto; and
second connection means operatively formed in each frame for receiving a wheel supporting bracket.

13. The caster wheel conversion mechanism of claim 11 wherein each of said caster wheel assemblies further includes:
a third connection means operatively formed in each of said assemblies for receiving a respective end of said tie rod.

14. The caster wheel conversion mechanism of claim 10 wherein each elongated member further includes:
a U-shaped slot formed in one end thereof for operatively interconnecting said elongated member to the axle remaining with fixed wheels mounted thereon.

15. The caster wheel conversion mechanism of claim 14 wherein the axle having said fixed wheels mounted thereon has a groove formed therein for operatively receiving said U-shaped slot.

16. A method for replacing two of the four fixed direction wheels of a walk-behind mower having a front and a rear axle with a caster wheel conversion mechanism having a left and a right side comprising the steps of:
removing each of said front fixed direction wheels from said front axle;
connecting said caster wheel conversion mechanism to said rear axle; and
connecting said caster wheel conversion mechanism to said front axle.

17. The method of claim 16 wherein said rear axle connecting step further comprises the step of:
connecting either one of said left or said right side of said conversion mechanism to said rear axle.

18. The mechanism of claim 17 wherein said front axle connecting step further comprises the step of:
connecting the side of the mechanism first connected to said rear axle to said front axle.

19. The method of claim 18 wherein said rear axle connecting step further comprises the step of:

connecting the remaining side of said conversion mechanism to the remaining rear axle.

20. The method of claim 19 wherein said method further comprises the step of:
  operatively connecting a tie rod to both sides of said conversion mechanism.

21. The method of claim 19 wherein said method further comprises the step of:
  adjusting each wheel to the same height above a supporting surface.

22. A caster wheel conversion mechanism for a walk-behind mower having a housing and two axles with fixed directional front and rear wheels; said mechanisms adapted to replace at least one of the fixed directional wheels and comprising:
  means, operatively connected to one of said fixed directional wheels, for removing said fixed directional wheel from one of said axles;
  means, operatively connected to said conversion mechanism, for connecting said conversion mechanism to said housing at a point proximate the axle having fixed wheels mounted thereon; and
  means for operatively connecting said conversion mechanism to said axle from which said fixed wheel has been removed.

23. The caster wheel conversion mechanism of claim 22 which further includes caster wheel means rotatably carried by bracket means.

24. A method for utilizing a caster wheel conversion mechanism having a left and right side assembly to replace at least two of the fixed direction wheels carried on a walk behind mower having a housing and front and rear axles carrying said wheels, said method comprising the steps of:
  removing at least two fixed direction wheels;
  connecting the left and right side assemblies to the end portions of the other axle;
  connecting the left and right side assemblies to the axle from which the fixed wheels have been removed.

25. The method of claim 25 wherein either of the left and right side assemblies can first be connected to one end portion of said axle having said fixed direction wheels mounted thereon with the other side assembly then being connected to the other end portion of said axle.

26. The method of claim 25 wherein said method further comprises the step of:
  operatively connecting a tie rod to both assemblies of said conversion mechanism.

27. The method of claim 25 wherein said method further comprises the step of:
  adjusting each wheel to approximately the same height above a supporting surface.

28. Mechanism useable with a walk-behind mower having a housing and front and rear axles, each axle having fixed direction wheels carried on its end portions, said mechanism adapted to convert one of the fixed direction wheels to a caster wheel; the mechanism comprising:
  a caster wheel assembly including a castering wheel carried on a bracket which includes means connectable to one end of an axle; and
  structure connected to the caster wheel assembly and extending therefrom and adapted to be connected with the mower housing.

29. The invention defined in claim 28 wherein the caster wheel assembly is further provided with selectably engageable means for locking the castering wheel in a fixed position relative to the housing.

30. The invention defined in claim 29 wherein there is further provided biasing means adapted to urge the means for locking towards an engaged position.

31. The invention as defined in claim 28 wherein the structure connected to the caster wheel assembly and extending therefrom includes means connectable with pin means carried by the housing.

* * * * *